(No Model.) 2 Sheets—Sheet 1.
C. KOCH.
MACHINE FOR WASHING BARLEY AND OTHER GRAIN.
No. 364,354. Patented June 7, 1887.
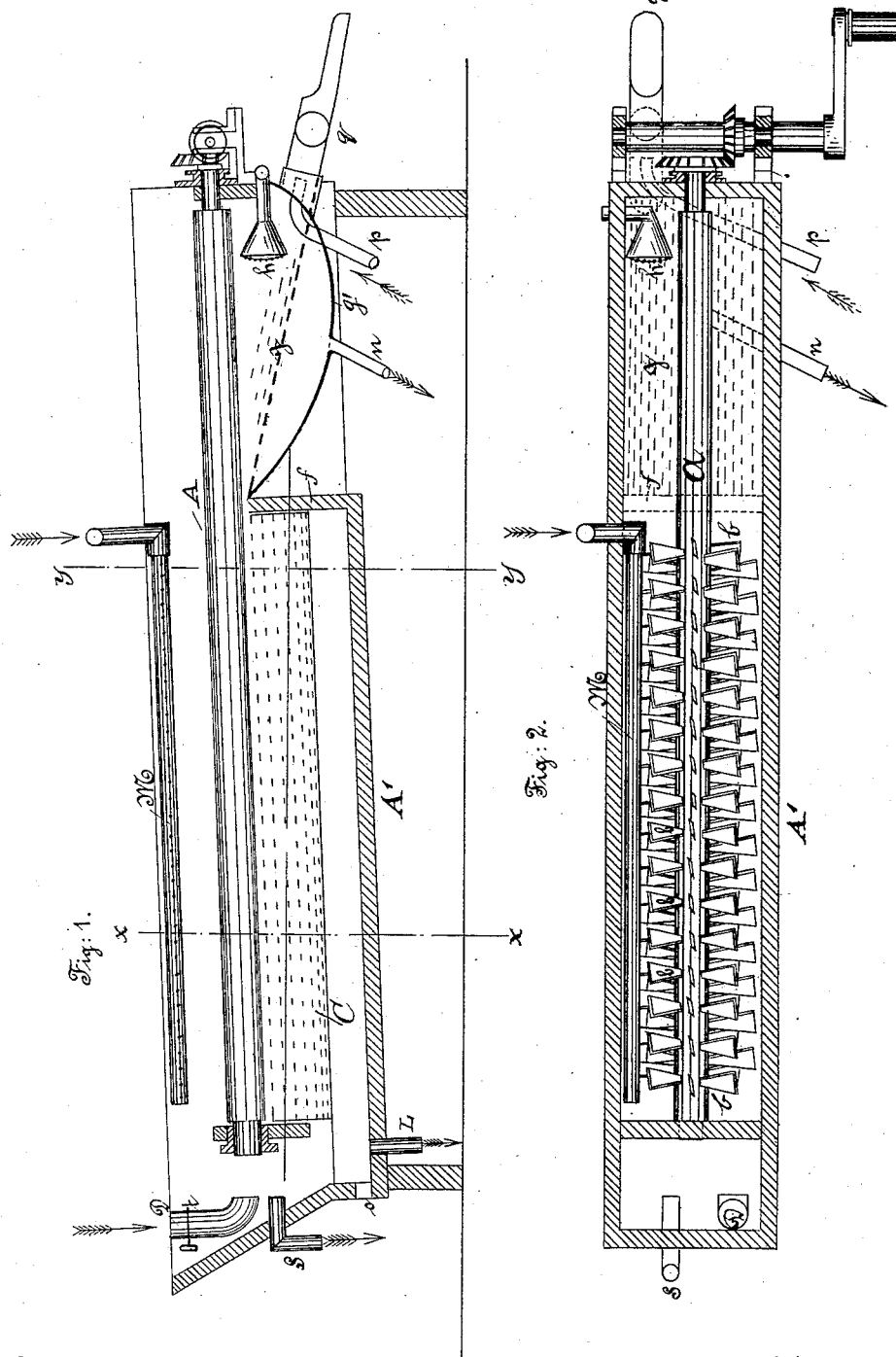
Witnesses:
Martin Petry
Carl Stark
Inventor:
Carl Koch
by Hoeper & Raegener
Attorneys.

(No Model.) 2 Sheets—Sheet 2.

C. KOCH.
MACHINE FOR WASHING BARLEY AND OTHER GRAIN.

No. 364,354. Patented June 7, 1887.

Witnesses.
Martin Petry.
Carl Karp

Inventor.
Carl Koch
by Goepel & Raegener
Attorneys.

UNITED STATES PATENT OFFICE.

CARL KOCH, OF WISMAR, MECKLENBURG-SCHWERIN, GERMANY.

MACHINE FOR WASHING BARLEY OR OTHER GRAIN.

SPECIFICATION forming part of Letters Patent No. 364,354, dated June 7, 1887.

Application filed September 12, 1885. Renewed February 4, 1887. Serial No. 226,592. (No model.)

*To all whom it may concern:*

Be it known that I, CARL KOCH, of Wismar, Mecklenburg-Schwerin, Germany, have invented certain new and useful Improvements in Machines for Washing Barley or other Grain, of which the following is a specification.

This invention relates to an improved machine for washing barley, so as to quickly and uniformly remove the adhering dust preparatory to malting said barley; and the invention consists of a barley-washing machine in which the barley is supplied to an inclined perforated trough located in an outer casing or box and moved by an inclined rotating agitator, while being exposed to the sprays of a jet-pipe, so as to be cleansed of dirt, it being finally discharged over a bridge at the upper end of the trough to a screen and trough having a discharge-pipe. Above the screen is arranged a jet-rose, and at the lower end of the same a discharge-spout, to which a water-pipe is connected for uniformly conveying off the grain.

Figure 3:
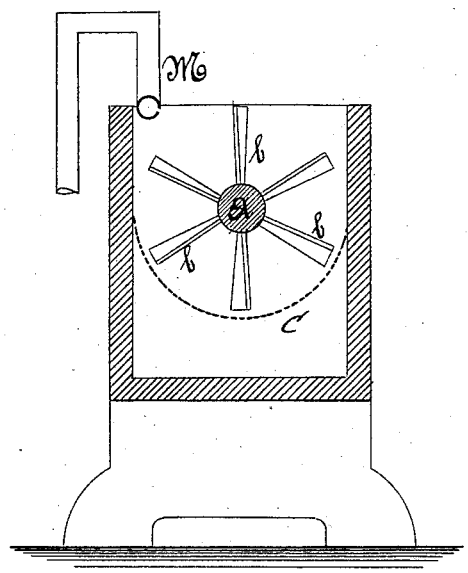
Figure 4:
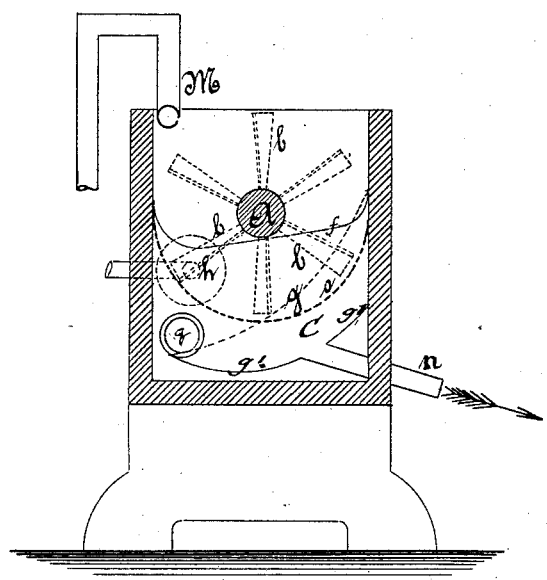

In the accompanying drawings, Figure 1 represents a vertical longitudinal section of my improved machine for washing barley, the stirrer-arms upon the agitator-shaft being omitted for the sake of clearness. Fig. 2 is a plan of the same. Figs. 3 and 4 are respectively transverse sections of the same on lines *x x* and *y y*, Fig. 1.

Similar letters of reference indicate corresponding parts.

In the drawings, A represents a rotating agitator-shaft the journals of which turn in suitable bearings arranged at different heights, so that a certain inclination is given to the shaft. Below the shaft A is arranged an oblong box, A', within which is located a semicircular perforated trough, C, that is open at the lower end and closed at the upper end by a transverse bridge, *f*.

The trough C and the box A' have the same inclination as the agitator-shaft A. The shaft A is rotated by gear-wheels and hand-crank and by a belt and pulley transmission from a power-shaft.

The barley or other grain to be cleaned is supplied by a pipe, D, which is arranged at the lower end of the box A' and provided with a slide, *t*, for regulating the supply of barley. The shaft A is provided with inclined and spirally-arranged stirrer-arms *b*, that take up the barley supplied by the spout and screw it gradually in upward direction through the trough C. At one side of the box A' is arranged a longitudinal perforated pipe, M, which supplies jets of water to the barley while the same is slowly screwed by the shaft through the trough.

By the joint action of the water and the stirrer-arms *b b* the grains of barley are cleansed of any adhering dust or dirt, which is washed off and conducted through the perforations in the bottom of the box C and passed off through the pipe L at the lower end of the box A'. The sediments collecting at the bottom of the box A' are removed from time to time by jets of water that are forced in through openings *o* in the lower end wall of the box and drained off through said openings, which openings are plugged up while the machine is in use. When the washed barley arrives at the upper end of the trough C, it is conveyed over a transverse bridge, *f*, to an inclined screen, *g*. While passing over the screen the barley is again washed by jets of water supplied by a sprinkling-rose, *h*. The water that passes through the inclined screen *g* is collected by a sheet-metal trough, *g'*, below the screen *g* and conducted off at the lowest part of the trough *g'* by a pipe, *n*. The barley passes over the inclined screen *g* to a discharge-spout, *q*, which is connected at the inner end with a water-pipe, *p*, that injects a jet of water, by which the barley is carried off in regular manner without choking up the discharge-spout. A waste-pipe, *s*, is arranged at the lower end of the box A' at a level with the upper edge of the bridge *f*, so that the water in the box is prevented from flowing over the bridge to that part of the machine in which the second washing takes place. The discharge-spout *q* may be arranged with a suitable universal joint, so that it can be turned from one side to the other for directing the course of the barley.

The advantages of my improved barley-washing machine are, first, the barley is gradually screwed forward by the inclined and spirally-arranged arms of the agitator, which moves the barley in a direction opposite to that of the jets supplied by the longitudinal pipe M, so as to lift the barley toward the jets and then drop it, whereby it is effectively cleansed of adhering dirt and impurities; second, by the arrangement of the pipe M at one side of the box A' the barley can be raised close to the jets, so as to be exposed to the full washing action of the same; third, by the second washing of the barley before it passes off through the discharge-spout any adhering dirt is removed; fourth, a regular and uniform discharge of the washed barley takes place by the injector-like action of the water supplied by the pipe to the interior of the discharge-spout.

Having thus described my invention, I claim as new and desire to secure by Letters Patent—

1. The combination of a supporting-box having an interior perforated trough, a rotary agitator having spirally-arranged stirrer-arms, and a longitudinal jet-pipe arranged at one side of the box, substantially as set forth.

2. The combination of a supporting-box having an inclined perforated trough, a rotary inclined agitator having spirally-arranged stirrer-arms, a longitudinal jet-pipe arranged at one side of the box, a transverse bridge at the upper end of the box, and an overflow-pipe arranged at the lower end of the box on a level with the upper edge of the bridge, substantially as set forth.

3. The combination of a box having an inclined perforated trough, a rotary agitator located within said trough, a transverse bridge at the upper end of the box, a longitudinal jet-pipe, an inclined screen communicating with the upper edge of the bridge, a collecting-trough below the screen, a sprinkler located above the screen, and a discharge-spout at the lower end of the screen, substantially as set forth.

4. The combination of a box, A', having a transverse bridge, $f$, an inclined perforated trough, C, a rotary agitator, A, a longitudinal jet-pipe, M, an inclined screen, $g$, a sprinkler, $h$, a collecting-trough, $g'$, having discharge-pipe $n$, and a discharge-spout, $q$, having an ejector-pipe, $p$, substantially as set forth.

In testimony that I claim the foregoing as my invention I have signed my name in presence of two subscribing witnesses.

CARL KOCH.

Witnesses:
C. L. TH. MÜLLAR,
B. ROI.